June 7, 1932.  A. C. MAXFIELD  1,861,504
ADAPTER FOR MACHINE TOOLS
Original Filed July 11, 1929
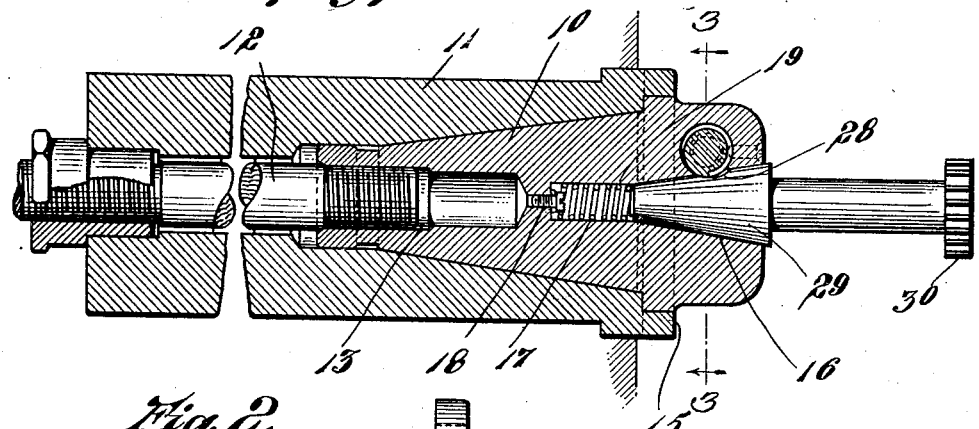
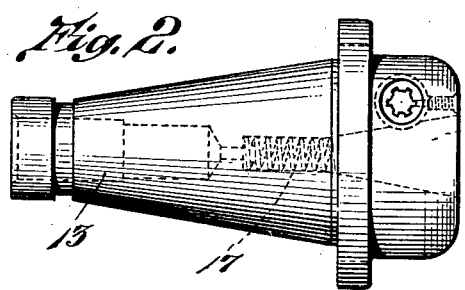
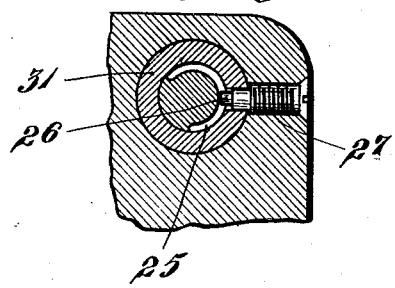
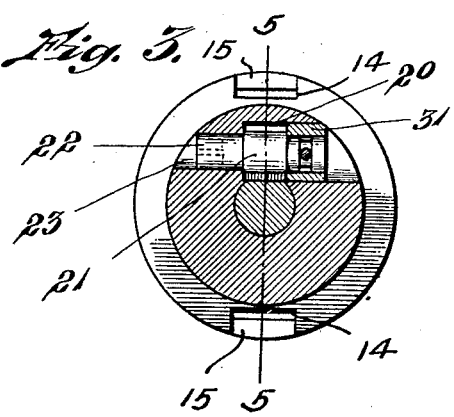
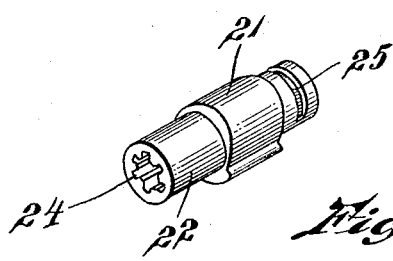
INVENTOR.
Arthur C. Maxfield
BY Barlow & Barlow
ATTORNEYS.

Patented June 7, 1932

1,861,504

REISSUED

UNITED STATES PATENT OFFICE

ARTHUR C. MAXFIELD, OF CRANSTON, RHODE ISLAND, ASSIGNOR TO BROWN & SHARPE MANUFACTURING COMPANY, OF PROVIDENCE, RHODE ISLAND, A CORPORATION OF RHODE ISLAND

ADAPTER FOR MACHINE TOOLS

Application filed July 11, 1929, Serial No. 377,428. Renewed April 23, 1932.

My present invention relates to adapters for machine tools, and has particular reference to adapters for use with milling machines.

One object of my invention is to provide an adapter so constructed that tool shanks mounted therein may be readily removed therefrom.

A second object of my invention is to utilize an adapter which has a socket with a non-sticking taper for receiving tool shanks.

A third object is to provide a positive lock for a tool shank inserted within the adapter.

A fourth object of my invention is the provision of a floating seat in the adapter to prevent complete seating of the tool shank therein until the locking elements are in locking alignment.

A fifth object is to utilize the movement of a manually operable cam lock for completing the tool shank seating movement and for locking the tool shank within the adapter.

A further object is to limit the movement of the cam lock between open and locked positions.

Other objects and advantageous features will be readily apparent from the detailed description following, in conjunction with the accompanying drawing, and will be particularly pointed out in the appended claims.

In the drawing, Figure 1 is an assembly view showing the improved adapter positioned in a standard spindle, with a machine tool locked therein;

Figure 2 is a sectional elevation of the adapter;

Figure 3 is a section thereof on the line 3—3 of Figure 1;

Figure 4 is a perspective view of the locking cam; and

Figure 5 is a section on the line 5—5 of Figure 3, showing the extent of the movement limiting groove.

The adapters heretofore used for holding machine tools of relatively small shank diameters have had a low pitch taper socket for receiving the tool shank, which is forced in with a driving fit. To remove the tool it has heretofore been necessary to use a drift pin or to drive the tool out, thus requiring the removal of the adapter from the spindle. Under certain circumstances, it has also happened that a tool shank seated in the spindle for an extended period, often becomes frozen to the spindle, and removal therefrom is attended with great difficulty; and many firms, to obviate this difficulty, periodically remove, oil, and reset the tools within the adapters.

I have overcome these disadvantages by providing an adapter with a short, abrupt, non-sticking taper and with a locking drive cam which enters a recess in the tool shank to positively lock the tool shank therein; and I have provided a floating, spring-pressed seat which permits free rotation to facilitate alignment of the tool recess and the cam locks, and prevents complete seating of the tool shank until the alignment is completed. I have also limited the rotation of the locking cam by providing a groove thereon which cooperates with the pilot stop of a set screw in the adapter, and thus prevents over-rotation of the locking cam in either direction.

My improved construction therefore permits ready interchangeability of machine tools without removal of the adapter, and ensures proper seating and locking of the machine tool shanks in the adapter socket; and the following is a detailed description of one form of adapter which embodies the features of my invention.

Referring to the drawing, 10 designates the improved adapter, which is seated within a spindle 11 of standard type, and locked in the spindle by means of the usual through bolt 12, which engages a screw threaded recess 13 in the inner end of the adapter. As shown in Figure 3, the adapter has the usual slots 14 for cooperating with the projections 15 of the spindle.

Considering Figure 1, it will be noted that the adapter 10 has a short tool shank receiving socket 16 with a sharp, nonsticking taper, preferably about 20 degrees. The socket 16 terminates in a cylindrical recess 17 having a stud bolt 18 screw threadedly engaging the base thereof and serving as a locking means for a compression spring 19 seated in the recess 17 and normally projecting into the socket 16.

As will be noted in Figure 3, a recess 20 transverse to the socket 16 is positioned in the head of the adapter, and houses a rotatable cam 21 shown in perspective in Figure 4. The cam has an operating stem 22, housed in a recess 23 aligned with the recess 20, and having the usual safety internal slots 24 for reception of the turning wrench. The other end of the cam is provided with a groove 25 within which a pilot stop 26 of a set screw 27 secured in the adapter head seats, for limiting the rotary movement of the cam.

The cam, as shown in Figure 1, is of spiral contour, the inner portion being of a diameter small enough to permit free movement of the tool shank within the socket, and the outer portion projecting into the socket to engage a cooperating recess or slot 28 formed in the tool shank 29 of a machine tool 30; thus serving as a locking drive cam. A bushing 31 through which the set screw 27 passes, locks the cam within the transverse recess 20.

The operation of my improved adapter is as follows:

The cam being in non-locking position, the tool shank of a machine tool is inserted in the adapter socket. The end of the tool shank engages the spring, and freely rotates to permit alignment of the recess in the tool shank with the cam, complete seating being prevented until the alignment is completed; turning the cam then in a clock-wise direction forces the cam into the recess and also forces the tool shank rearwardly to firmly seat in the socket against the pressure of the spring. The pilot end 26 prevents overrunning of the cam and indicates both the unlocked and the fully locked positions to the operator.

It will thus be apparent that the improved adapter eliminates the sticking of tool shanks therein, and permits ready removal therefrom, prevents the freezing of tool shanks therein, positively locks the tool shanks in firm seating engagement with the adapter socket, insures positioning of the locking device in either locking or unlocking position, and has no protruding bolt heads which may endanger the operator's safety.

While I have disclosed one preferred embodiment of my invention, it is obvious that various changes in structure and arrangement may be made, within the scope of my invention as defined in the appended claims.

I claim:

1. An adapter for machine tools having a tapered conical tool shank receiving socket, a spring seat forming the base of said socket, and a locking and driving element rotatably mounted and having a projection movable into said socket.

2. An adapter for machine tools having a tapered conical tool shank receiving socket, a plug mounted for rotation contiguous to said socket, and a cam extending from said plug and projectable into said socket on rotation of said plug.

3. An adapter for machine tools having a tapered conical tool shank receiving socket, a plug mounted for rotation contiguous to said socket, a cam extending from said plug and projectable into said socket on rotation of said plug, and means for limiting the rotatable movement of said plug.

4. An adapter for machine tools having a tapered tool shank receiving socket, a plug mounted for rotation contiguous to said socket, a cam on said plug projectable into said socket on rotation of said plug, a groove on said plug of predetermined length, and a stop on said adapter positioned within said groove.

5. An adapter for machine tools having a tapered conical tool shank receiving socket, a spring seat forming the base of said socket, a circular plug mounted for rotation contiguous to said socket, and a cam extending from said plug and projectable into said socket on rotation of said plug.

6. An adapter for machine tools having a tapered conical tool shank receiving socket, a spring seat forming the base of said socket, a circular plug mounted for rotation contiguous to said socket, a cam on said plug projectable into said socket on rotation of said plug, a groove on said plug of predetermined length, and a stop on said adapter positioned within said groove.

7. An adapter for machine tools having a tapered conical tool shank receiving socket, a spring seat forming the base of the socket, a recess in said adapter, a circular plug mounted in said recess for rotation contiguous to said socket, a cam on said plug projectable into said socket on rotation of said plug, a groove on said plug of predetermined length, a stop element positioned in said groove, and means for rotating said plug within said recess positioned below the surface of the adapter.

8. An adapter for machine tools having a tapered conical tool-shank receiving socket, a resilient seat forming a base for said socket, a locking element rotatably mounted in the wall of said socket and having a projection movable into said socket and adapted to engage an arcuate recess in the tool shank inserted into said socket for urging said tool inwardly of said socket and against the action of said seat.

9. In combination, an adapter for machine tools having a conical tool-shank receiving socket, a resilient seat forming a base for said socket, a cam rotatably mounted in the wall of said socket for projection into the socket, and a tool having a conical shank with an arcuate recess therein to receive said cam for urging said tool inwardly of said socket and against the action of said seat.

In testimony whereof I affix my signature.

ARTHUR C. MAXFIELD.